Aug. 15, 1933.  W. J. OBIDINE  1,922,319
SPEEDOMETER STOP MECHANISM
Filed Nov. 27, 1931  2 Sheets-Sheet 1
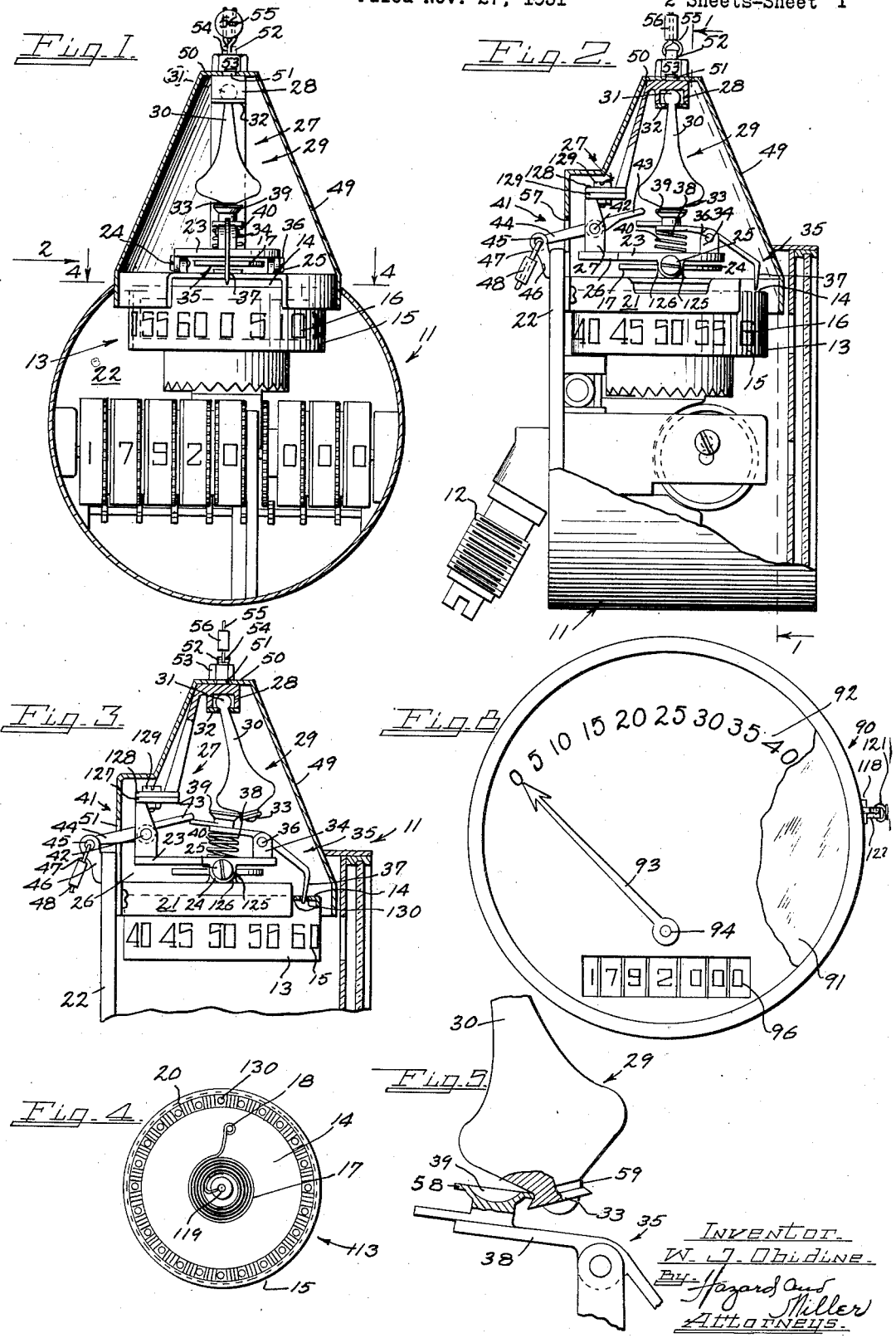

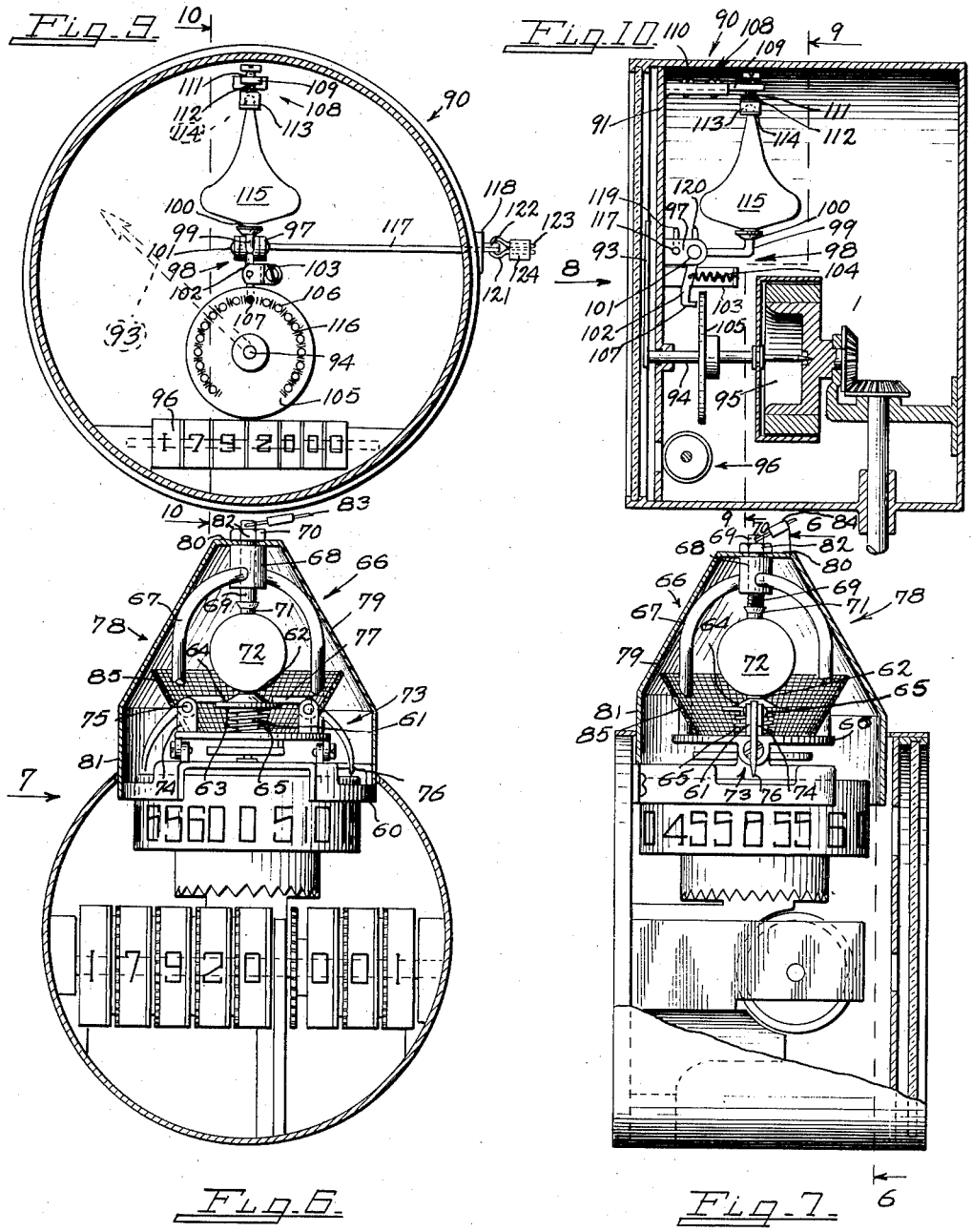

Patented Aug. 15, 1933

1,922,319

UNITED STATES PATENT OFFICE 1,922,319

SPEEDOMETER STOP MECHANISM

Wladimire J. Obidine, Los Angeles, Calif.

Application November 27, 1931
Serial No. 577,491

46 Claims. (Cl. 116—57)

My invention is designed to positively stop the speed indicator of a speedometer for a vehicle should the vehicle meet with an accident of a type such as would cause a considerable jar to the vehicle, and such stop being arranged so that the speed indicator is retained at the indication of the speed of the vehicle at the time of such accident and cannot be reset except by an authorized party.

An object of my invention is to be able to stop and to hold the indicator in the stopped position so that the speed at which the vehicle is traveling at the time of the accident may be observed and noted by proper parties and may be used as evidence in legal suits arising out of the accident.

A further object and feature of my invention is to provide a positive stop mechanism for the speed indicator of a speedometer of such a character that road bumps, no matter substantially how severe, will have no effect on stopping the indicator but if the vehicle is suddenly brought to a stop or is laterally displaced by being side swiped, bumped from the rear, or turned over, the indicator will be brought to a stop and the speed the vehicle was traveling at the instant at which it was either suddenly stopped or deflected from its line of travel or suddenly bumped forward will be indicated. In this connection my speedometer stop is designed to allow the speed indicator to be workable in substantially all normal travel of a vehicle but to immediately stop the speed indicator should anything unusual occur in the travel of the vehicle, such as to cause a decided lateral or fore and aft jarring of the vehicle.

My stop mechanism is designed also to operate should the vehicle itself cause the accident; for instance, as by a sudden skid against the curb or off the road sufficient to give a lateral jar, or by colliding with some obstruction. Also, my stop mechanism is designed to operate should the vehicle be bumped as by a rear end collision, or should the vehicle be standing still and receive a sudden impact of some type or other. As my stop mechanism is arranged that the resetting cannot be readily done at the time of the accident but would need the attention of an authorized party, the indicator will remain showing the speed at the time of such accident, whether this be from zero to the maximum the vehicle could travel. A record may, therefore, be made of this which could be used in settling disputes as to the accident or the speedometer could be dismounted from the vehicle to be used in any such settlement or lawsuits. I propose to have the mechanism so that it is only resettable by an authorized party by having the resetting mechanism enclosed in a sealed cover or by using a seal to hold the resetting mechanism inoperative.

In more detail, an object of my invention is to utilize a weight which, through its inertia, will be laterally displaced on any type of shock except more or less vertical shocks, and this weight is used to retain gripping devices inoperative, which gripping devices when released will hold the dial of a dial type of speed indicator or hold the pointer of a pointer type of speed indicator and retain this held in the position of the indication at the time of the jar which displaces the weight. In this connection, a further detailed object and feature of my invention as relates to a dial type of speed indicator is to utilize pivoted fingers or levers which may engage the dial to hold it stationary, and such fingers or levers are held in inoperative position by a displaceable weight. Such weight may be mounted normally between, for instance, a socket on the finger and lever at the bottom and an upper stationary socket. Such weight may be in the form of a heavy pendulum swung from the upper socket and by a jolt in a direction other than the vertical displaced from the lower socket to release the lever or retaining fingers, and such lever or retaining fingers can only be released by a resetting mechanism which will displace the levers sufficiently to allow resetting of the pendulum weight.

In another type, I may have a ball positioned between the retaining or stopping levers, and a fixed socket, which weight will be bodily displaced on jars or jolts other than the vertical.

In the pointer type of speed indicator in which a pointer moves over the scale, such pointers are usually operated in present types of instruments by a magnetic actuating device, and on the shafts having the pointer arm I mount a disk or segment having serrations or perforations in which a finger of a locking lever may engage when such lever is released by displacement of a weight which normally holds such locking lever inoperative.

My invention is illustrated in connection with the accompanying drawings, in which:

Fig. 1 is a vertical section on the line 1—1 of Fig. 2 in the direction of the arrows;

Fig. 2 is a side elevation taken in the direction of the arrow 2 of Fig. 1 with the outside casing broken away and certain parts being illustrated in section, showing the speed indicator in its operative position;

Fig. 3 is a view similar to Fig. 2 with the speed indicator in its locked position;

Fig. 4 is a horizontal section on the line 4—4 of Fig. 1 in the direction of the arrows, showing the upper side of the speed indicator;

Fig. 5 is an elevation partly in section of the lower socket and the lower end of the pendulum;

Fig. 6 is a vertical section on the line 6—6 of Fig. 7 in the direction of the arrows of a modification of a locking mechanism using the same type of speedometer and indicating dial;

Fig. 7 is a side elevation taken in the direction of the arrow 7 of Fig. 6 with parts broken away and certain parts being illustrated in section;

Fig. 8 is a front elevation taken in the direction of the arrow 8 of Fig. 10 of a pointer type of speedometer;

Fig. 9 is a vertical section on the line 9—9 of Fig. 10 in the direction of the arrows;

Fig. 10 is a section on the line 10—10 of Fig. 9 in the direction of the arrows.

Referring first to the construction of Figs. 1, 2, and 3. In this I use a standard type of speedometer having a casing 11 which has the coupling 12 connected thereto for attachment of the flexible speedometer shaft. It is not necessary to describe the drive of the speedometer except to state that the dial 13 is magnetically driven and is usually in the form of an inverted cup having a top 14 and a side skirt 15 on which there are the numerals 16 designating the speed of the vehicle. A coiled spring 17 is secured at one point 18 to the upper surface of the dial and at the center pin 19 to a fixed center, this being the spring which returns the dial to its zero position and operates against the magnetic field, tending to rotate the dial. In my construction I have a knurled or radially corrugated surface 20 on top of the dial at the peripheral portion. This may be designated as an annular knurled section.

The standard speedometer is provided with a top plate 21 secured rigidly to the back wall 22 of the speedometer casing and it is in this plate the pin 19 is journaled. I utilize this plate to support a base plate 23 of my stop mechanism which is applied to the speedometer. This base plate may be attached on diametrically opposite parts 24 or there may be several fastenings, these having screws 25. The base is bent upwardly, giving a clearance 26 for the operation of the hair spring 17. The base plate 23 is thereby supported a sufficient height above the plate 21. A substantial post 27 is secured to the base 23 and extends upwardly, preferably on a slope, and has an inverted socket 28 at the top. This socket is used to suspend a weight or pendulum 29, such pendulum having a narrow neck 30 at the top with a ball 31 fitting in the socket 28 and a securing ring 32 below the ball and encircling the neck 30 and secured to the marginal portion of the socket 29. This suspends the pendulum but allows it to swing on the ball 31. The bottom of the pendulum is provided with a slight projection 33.

Extending upwardly from the base 23 there is a journal stud 34 which has a locking lever 35 pivoted thereto by a pivot axle 36. One end of this lever has a downwardly turned pointed end 37 which is adapted to engage in the knurled or corrugated ring 20 on the top of the dial. The other end 38 of this lever has a lower socket 39 secured thereto. A compression spring 40 tends to force the socket upwardly and the point 37 downwardly to engage the dial.

A setting device comprises a setting lever 41 which is pivoted in a transverse slot in the post 27 having a pivot pin 42. The inner end 43 of this lever is positioned to engage the end 38 of the locking lever 35, and to depress this. The outer end 44 has an eye which is adapted to be brought into alignment with an eye 45 on the bracket 46, such bracket being secured to the back plate 22 of the speedometer case. A wire 47 may extend through these two eyes and such wire has its ends bent together and secured by a lead or similar seal 48.

In order to form a cover to prevent access to the pendulum and operative parts of the stop mechanism, a cover 49 is utilized, this preferably being somewhat conical in shape and having a flat top 50 with a perforation 51 therethrough. This flat top rests on the top of the member forming the socket 28. A screw threaded bolt 52 extends upwardly from this socket member, on which there is a clamp nut 53 attached. At the upper end of the screw threaded bolt 52 there is an eye 54 through which extends a wire 55, this wire having its ends bent together, and such ends are secured by a lead seal 56 or the like. One side of the cover is provided with a narrow slot 57 of sufficient width to give room for the lever 41.

In the manner of operation and function of the device, before attaching the seal 48 the setting lever is operated to press down on the locking lever, compressing the spring 40, and when the speedometer is held in such a manner that the pendulum may be suspended vertically the end 33 will fit in the socket 39. Then on release of the setting lever and the spring forcing up on the locking lever and, hence, the socket 39, the pendulum weight 29 is gripped between the lower socket 39 and the upper socket 28. The seal 48 may then be attached. This moves the setting lever out of position so it cannot engage the locking lever 35 until at least the pendulum has been operated to stop the speedometer indicator dial.

On account of the pendulum or weight which is shown with a heavy lower end being supported between the two sockets, this can withstand vertical shocks of large magnitude and equal to any shocks in a vertical direction an automobile will meet in ordinary travel without jarring loose. However, due to inertia of the heavy pendulum weight, should the speedometer receive a jolt in a horizontal direction through the vehicle being struck or shifted or should the vehicle turn over on its side the weight will become displaced from the lower socket 39 in a position as indicated in Fig. 3, in which case the spring 40 will thrust upwardly on the locking lever 35, forcing the point 37 into engagement with the corrugated or knurled ring 20, thus holding the speedometer dial stationary at the speed at which the vehicle was traveling when the speedometer was subjected to this jar or shock.

In order to prevent resetting by endeavoring to remove the speedometer of the vehicle and swinging this in various directions, the socket 39 is made with a relatively sharp peripheral edge 58 (note Fig. 5) which is adapted to engage an annular groove 59 on the projection 33 and, hence, prevent the pendulum from swinging into the socket 39. Having this sharp edge and the peripheral groove is merely a precaution to prevent a swing of the pendulum being sufficient to depress the socket member 29 to allow interengagement of the pendulum end and this socket.

On account of the resetting lever being locked in an inoperative position and requiring removal of the seal and also on account of the cover enclosing the pendulum being fastened in position and only removable by removing the seal, it will be apparent that if the seals are properly identified when the speedometer is first installed in the vehicle that the indication shown on the speedometer at the time of an accident could be taken as evidence in connection with any investigation, adjustment of damages, or litigation arising out of the accident.

In connection with the construction of Figs. 6 and 7, I employ the same type of speedometer using a similar dial with a base plate 60 which is secured to the top plate 21 of the speedometer. In this case the base plate is raised at the center to accommodate the hair spring of the speedometer. A guide pin 61 extends through an opening in the base plate and is guided therein, said pin having a small socket 62 on the top with a disk 63 immediately below the socket. Such disk is illustrated as having a sloping upper surface 64; and a compression spring 65 surrounds the pin and bears on the base plate and against the under side of the disk, thus tending to thrust the socket upwardly. A cage 66 is formed of wires or bars 67 secured at their lower ends to the base and at their upper ends to a hub 68. This hub has a threaded pin 69 therein; such pin is adjustable in the hub; such hub being internally threaded, and is locked by a lock nut 70. The pin at its lower end carries a socket 71. A weight in the form of a ball 72 is fitted between the two sockets, the spring pressure being sufficient that under all normal bumps or jolts in a more or less vertical direction it will hold the ball in the two sockets; but if the speedometer, through the medium of the vehicle being struck or in an accident causing a jolt or turning over of the vehicle, is jarred, it will cause the displacement of this ball due to its inertia.

A pair of locking levers 73 are employed, each being somewhat in the shape of a bell crank and mounted on studs or brackets 74 by means of pivot pins 75. These levers have a sharpened pointed end 76 to engage the knurled portion of the indicator dial. Normally the ball presses the disk downwardly so that the upper or counterweighted end 77 of the locking levers may normally rest on the disk but this disk is sufficiently depressed to elevate the points 76 above the top of the indicator dial. However, when the ball is displaced the spring 65 forces the disk 63 upwardly, which disk, acting on the ends 77 of the locking levers brings the points 76 into locking engagement with the annular knurled surface on the dial and holds the dial stationary.

A cover 78 is fitted over the cage 66, the ball and the mechanism connected thereto, and this cage is illustrated as having sloping sides 79, a flat top 80, and a skirt 81, which forms a close fit with the speedometer casing. The top has a perforation through which extends the threaded pin 69, and a nut 82 threaded on this pin holds the flat top of the cover against the top of the lock nut 70. The upper end of the pin has a perforation through which is extended a bent wire 83 having a lead or equivalent seal 84. Thus the cover can only be removed after breaking the seal of the wire. In order to prevent the ball from being lost on removal of the cover, a basket 85 is secured to the base plate 60, this basket flaring outwardly beyond the cage 66 but being designed so that it cannot interfere with the operation of the locking levers 73 which pass through openings in the cage.

In the construction of Figs. 8, 9, and 10, the speedometer is indicated as being of a different type. Part of the case of this speedometer is indicated by the numeral 90. This has a face plate 91 with a scale 92 with numerals thereon designating the different speeds. The pointer 93 is mounted on an oscillating shaft 94, which shaft is suitably journaled and usually actuated by a magnetic device indicated at 95 operated by the speedometer mechanism. Such a speedometer mechanism also employs indicating disks 96 to show the distance traveled. In this type of speedometer I employ a face plate 91 as the mounting for a bracket 97, which bracket has a bell crank 98 mounted therein, one end 99 of this having a lower socket 100. The bell crank is pivoted on a pivot 101 in the bracket 97 and has a latching arm 102. An arm 103 extending laterally from the face plate supports a compression spring 104 between the end of this arm and the latching arm 102. On the shaft 94 there is mounted a locking disk or segment 105 having a series of perforations 106 through which the finger 107 of the locking lever 102 may engage.

An adjusting bracket 108 is mounted on the inside of the face plate and in this bracket there is a sliding arm 109 having a screw and slot connection 110 with the bracket 108. The arm 109 has a perforation 110 at the end through which extends a pin 111, on which pin there is coiled a spring 112 and secured to the bottom of the pin there is a socket 113 which engages the spherical type end 114 of the pendulum type of weight 115. The socket may be substantially of the same general type as shown in Figs. 1 and 2. Thus the weight is held between the upper socket 113 and the lower socket 100 and on displacement of the weight due to the lateral jolt, the latching lever is released, the spring 104 causing the finger end 107 to engage in one of the perforations or the intermediate serrations 116 on the disk 105, which act holds the pointer stationary.

In order to reset the weight I employ a resetting rock shaft 117 which is journaled in the bracket 97 at one end and in the outer part at the case 118. This has an upwardly extending finger 119 on the inside adapted to engage a projection 120 on the bell crank 98. This rock shaft 117 has a laterally extending end 121 on the outside which in the inoperative position fits against a bracket 122. The handle end and the bracket both have perforations through which may be inserted a wire 123 and a seal 124 attached to the wire. This holds the resetting rock shaft and the inner finger 119 in an inoperative position. However, when it is desired to reset the weight the seal may be broken and the finger grip end of the rock shaft engaged by the fingers and turned to bring the finger end 119 into engagement with the element 120 and thus depress the bell crank 98 for resetting the weight.

In some cases the face of the speedometer is not vertical but is slightly inclined with an upward slope to facilitate the reading on an instrument panel, and in order that the sockets supporting and mounting the weight may be in vertical alignment the arm 109 is adjustable on the bracket 108. Usually the inclination of the speedometer is comparatively small so this adjustment does not have to be very great.

In Figs. 1, 2, and 3 the diametrically opposite parts 24 of the base plate consist of ears 125 which fit over lugs 126 on the frame portion of the speedometer so that the screws 25 when clamped tight will hold the base plate and the weight in the correct position. This also allows a slight tilting of the base plate. In order, however, to allow for a greater tilting when the speedometer base is not vertical, the post 27 is divided and has complementary lower and upper flanges 127 and 128, these being provided with slots with clamping bolts 129 extending therethrough. Therefore, by adjusting these bolts the adjustment of the upper socket 28 may be regulated to be vertically over the lower socket.

In the construction of Figs. 1 through 7 it is desirable to have the disks 14 not only provided with the knurled or corrugated surface 20 but also to have perforations 130. These may be located opposite each five miles of speed to afford a positive stop by the finger of the locking lever engaging in the perforation and preventing any jarring of the speedometer from shifting the dial to a lower speed indication.

In the construction of Figs. 6 and 7 it is desirable to mount the bed plate in the same general manner as illustrated in connection with Figs. 1 and 2, that is, the base plate being connected to the speedometer structure by pivot bolts diametrically opposite which will allow a slight tilting to accommodate the tilt of the speedometer on sloping instrument panels.

Where, in the specification and claims, I refer to a shock or jolt as being lateral or transverse to the normal operating position of the speedometer of a vehicle, this is intended broadly to cover any direction except that in a vertical direction through the normal position of the speedometer or vehicle, and includes shocks or jars due to a head-on collision, a rear collision, or collision from the sides.

Various changes may be made in the details of construction without departing from the spirit or scope of the invention as defined by the appended claims.

I claim:

1. In a speedometer having means to indicate the speed of a vehicle, a locking mechanism for the indicator having a displaceable device, means to mount said device to withstand displacement by jolts or jars substantially vertical when the speedometer is in its normal operating position but displaceable by shocks or jars transverse or lateral to such position, and means to operate the locking mechanism on displacement of the displaceable device to hold the indicator stationary indicating the approximate speed at the time of displacement.

2. In a speedometer having a speed indicator for a vehicle, a locking mechanism therefor, a device to retain the locking mechanism inoperative, said device being adapted to retain the locking device inoperative when subjected to shocks in a substantially vertical direction when the speedometer is in its normal operating position, and operative by the inertia of said device when subjected to shocks lateral or transverse to the normal position of the speedometer to release the locking mechanism, such locking mechanism retaining the speed indicator at approximately the speed indication at the time of such lateral or transverse shocks.

3. In a speedometer having means for connection to an operating part of a vehicle, a speed indicator actuated by said connection, a locking mechanism for said indicator, a displaceable device mounted to retain the locking mechanism inoperative during the normal operation of the speedometer and adapted to resist displacement by substantially vertical shocks when the speedometer is in its normal position but displaceable by its inertia when subjected to transverse or lateral shocks, and means operating on the locking mechanism to lock the indicator inoperative to indicate the speed at the time of such displacement, said connection to the vehicle being operative after such displacement without moving the speed indicator.

4. In a speedometer as claimed in claim 3, means to permit resetting of the displaceable device, and means to show an unauthorized resetting of said displaceable device.

5. In a speedometer having means for connection to an operating part of a vehicle, a speed indicator actuated through the medium of said connection, a locking mechanism for said indicator, a displaceable weight mounted to retain the locking mechanism inoperative during normal operation of the speedometer in its normal position, said weight being mounted to resist displacement by substantially vertical shocks but displaceable by its inertia by transverse or lateral shocks, and means operative on release of the displaceable weight to force the locking mechanism into locking engagement with the speed indicator and to retain such indicator at approximately the speed of the vehicle at the time of the displacement of the weight, said connection from the vehicle being operative after locking of the speed indicator on the continued movement of the vehicle.

6. In a speedometer as claimed in claim 5, an obstructing means to permit and to prevent resetting of said weight, and means to show an unauthorized use of the obstructing means to reset said weight.

7. In a speedometer having means for connection to an operating part of a vehicle to drive the same, a speed indicator actuated through the medium of said connection, a locking mechanism for said indicator, a displaceable weight mounted between two sockets, said sockets retaining the displaceable weight in position when subjected to shocks in a substantially vertical direction in the normal operation of the speedometer but allow displacement of the weight through its inertia when subjected to lateral or transverse shocks, means connected to one of the sockets to hold the locking mechanism inoperative but to move said mechanism into locking position with the indicator on release of said displaceable weight, the locking mechanism retaining the speed indicator locked showing the approximate speed at the time of said displacement, said speed indicator being thereby rendered inoperative in further movement of the vehicle and operation of said connection to the operating part of the vehicle.

8. In a speedometer as claimed in claim 7, at least one of said sockets being movable to permit resetting of the displaceable weight between the two sockets, and an obstructing means to permit and prevent manual operation of said socket and the displaceable weight, and means to show an unauthorized resetting of the displaceable weight.

9. In a speedometer having a speed indicator, and a connection to an operating part of the vehicle to actuate said indicator, a locking mechanism for said indicator, a displaceable weight mounted between two sockets, one of said sockets being operatively connected to the locking mechanism, and said sockets being adapted to retain the weight when subjected to substantially vertical shocks with the speedometer in its normal operation position but to release the weight due to its inertia on transverse or lateral shocks, means to urge one of the sockets in a direction of movement to apply the locking mechanism to lock the speed indicator giving substantially the speed of the indicator at the time of the displacement of the weight.

10. In a speedometer as claimed in claim 9, the upper end of the weight being secured in a socket to move in the manner of a pendulum, and the lower socket being displaceable in a vertical direction on release of the weight and depressible for resetting the weight.

11. In a speedometer having a speed indicator and an operating connection from the indicator to a moving part of the vehicle to indicate the speed of the vehicle, a pivotally mounted locking lever having means to engage the indicator and to hold same stationary, a displaceable weight, means to mount said weight to hold said locking lever inoperative during the normal operation of the vehicle and speedometer, said mounting resisting displacement of the weight due to shocks substantially vertical to the normal position of the speedometer but allowing displacement on shocks transverse or lateral thereto, the displacement of the weight releasing said locking lever, and means to urge said lever on such release into locking engagement with the indicator.

12. In a speedometer as claimed in claim 11, said locking lever being manually operable to depress same for resetting the weight, an obstructing means to prevent such manual operation, and means to show an unauthorized resetting of said weight.

13. In a speedometer, a disk having a mounting to permit partial rotation, means operatively connected therewith to give a speed indication, a displaceable device having a mounting to resist substantialy vertical shocks or jolts but to be displaced by a lateral shock or jar, and a locking means engaging the disk to hold same stationary when said device is displaced and thus retain the speed indicator at a fixed position.

14. In a speedometer as claimed in claim 13, said disk being operatively connected to a distance registry device of the speedometer, said registry device being operative on the continued movement of the vehicle without affecting the locking of said disk.

15. In a speedometer having a disk with a series of perforations therein, means to rotate said disk in relation to the speed of the vehicle, means operatively connected to the disk to indicate such speed, a displaceable device having a mounting to resist substantially vertical shocks or jolts but to be displaced by lateral shocks or jars, and means operative by the displacement of such device to lock the disk and hence the speed indicator, said locking means engaging said perforations.

16. In a speedometer having a fixed scale, a pointer mounted on a rotatable shaft, a disk on said shaft, means interconnected with the drive mechanism of the speedometer to rotate the shaft, the disk, and the pointer in a certain relation to the speed of the vehicle, a displaceable weight, a mounting for such weight, such mounting retaining the weight in position when subjected to substantially vertical shocks or jolts and allowing displacement of such weight when subjected to lateral jolts or jars, a locking means actuated by one of the mountings on release of the weight to engage the disk and to retain same in the locked position.

17. In a speedometer, means to transmit rotary motion from the device whose speed is to be indicated, a speed indicator operatively connected thereto, such connection having a movable device actuated in one direction by increasing speeds and returnable to lower speed indications by an indicator returning device, a displaceable mechanism having a mounting to retain said mechanism from displacement when subjected to shocks or jolts administered substantially vertically to the normal position of the speedometer but displaceable on administration of jolts or jars lateral thereto, and a locking means to engage the movable device and to lock same on displacement of the mechanism.

18. In a speedometer having a speed indicator and an operating connection from the indicator to a moving part of a vehicle to indicate the speed of such vehicle, a pendulum having one end pivoted to a relatively fixed structure and the other end engaged in a movable socket structure, said pendulum being adapted for displacement by a shock or jolt transverse to the connecting axis between the socket and the point of suspension of the pendulum, and a locking means actuated by the moving socket structure to substantially instantaneously lock said speed indicator.

19. In a speedometer as claimed in claim 18, a cover secured over the pendulum, and a sealing means for the cover to indicate on breaking of the seal a removal of the cover.

20. In a speedometer as claimed in claim 18, a cover attached to the suspending means for the pendulum, a resetting device for resetting the locking means, part of said resetting device extending outside of the cover, and a seal to retain such part in an inoperative position, the breaking of the seal being adapted to permit freeing of the resetting device for operation.

21. In a speedometer having a speed indicator with an operating connection from the indicator to a moving portion of the vehicle, a suspending structure having an upper socket, a pendulum pivotally mounted in said socket, a locking lever pivotally mounted and having a lower socket engaging the bottom of the pendulum, said locking lever having a locking means for the speed indicator, said pendulum being displaced from the lower socket by a shock or jar transverse to the axis between the two sockets, and means for urging the locking lever into a locking position with the speed indicator.

22. In a speedometer as claimed in claim 21, said suspension means having a cover connected thereto and extending downwardly over the pendulum to prevent manual contact with the pendulum, a seal for the cover requiring breaking to permit removal of the cover.

23. In a spedometer as claimed in claim 21, said suspension means having a cover connected thereto and extending downwardly over the pendulum to prevent manual contact with the pendulum, a seal for the cover requiring breaking to permit removal of the cover, and a resetting lever pivotally mounted and having one end positioned to engage the locking lever and the other end extending outside of the cover, the depression of the locking lever by the resetting lever permitting the pendulum to engage the socket on the locking lever, the resetting lever being attached in an inoperative position by its seal, the removal of such seal being necessary to permit operating the resetting lever to set the locking lever and pendulum.

24. In a speedometer having a speed indicator and an operative connection from the indicator to a moving part of a vehicle, a pivotally mounted pendulum, a locking means for the speed indicator having a moving socket, a spring urging the socket into engagement with the pendulum, and the locking lever into a locking arrangement with the speed indicator on displacement of the indicator from the socket, said pendulum having a projection engaging a rim portion of the socket after displacement.

25. In a speedometer having a speed indicator with an operating connection from the indicator to a moving portion of a vehicle, a suspending structure, a pendulum pivotally suspended from such structure, a locking device having a socket, the pendulum fitting in said socket, means to adjust the suspending structure to position the vertical axis through the socket and the pivot of the pendulum vertically, the pendulum being adapted for displacement by its inertia when subject to a shock transverse to said axis, and thereby releasing the locking means to lock the speed indicator.

26. In a speedometer as claimed in claim 25, the means to adjust the suspending structure comprising a post, and an adjustable support for such post.

27. In a speedometer having a speed indicator and an operating connection from the indicator to a moving part of a vehicle, a fixed structure having a relatively fixed socket, a locking device having a moving socket connecting thereto, a ball mounted between the two sockets, said ball being adapted for displacement by a shock or jolt transverse to the axis between the two sockets and to thereby release the locking means to lock the speed indicator.

28. In a speedometer having a speed indicator and an operating connection from the indicator to a moving part of the vehicle, a fixed cage having an upper socket connected thereto, a locking device for the speed indicator operatively connected to the movable socket, a ball positioned between the two sockets, said ball being displaceable by a shock or jolt transverse to the axial line between the two sockets.

29. In a speedometer as claimed in claim 28, a basket surrounding a portion of the cage to catch the ball on displacement.

30. In a speedometer as claimed in claim 28, the cage having a cover mounted thereon and extending downwardly over the ball and the locking means, and a seal connected to the cage, said seal being adapted for breaking to permit removal of the cover.

31. In a speedometer having a speed indicator and an operating connection from the indicator to a moving portion of a vehicle, a fixed cage having a hub at the top with an adjustable pin therein and a socket at the lower end of said pin, a structure having a movable socket with a spring means pressing said socket upwardly, locking devices operatively engaging said socket, a ball between the two sockets, said ball being adapted for displacement by a shock transverse to the axial line between the two sockets to release the locking device, and a basket surrounding part of the cage to receive the displaced ball.

32. In a speedometer as claimed in claim 31, the pin having the socket being provided with a cover extending over the cage and the ball, and a seal secured to the pin requiring breakage for removal of the cover.

33. In a speedometer as claimed in claim 31, means to adjust the axis between the two sockets comprising a base plate with the cage mounted thereon, said base plate being tiltable to adjust said axis vertically.

34. In a speedometer having moving means to indicate the speed of a vehicle, a stop means to stop the indicating means from operating, and a weight displaceable instantly on the speedometer being subject to a lateral jar or shock, said weight normally engaging the stop means and holding the same inoperative, and when displaced releasing the same stop means to stop the said moving means.

35. In a speedometer having moving means to indicate the speed of a vehicle, a stop means to stop the indicating means from operating, and a retention means for holding said stop means inoperative, said retention means being actuated due to its inertia when the speedometer is subjected to a lateral jar or shock to release the said stop means.

36. In a speedometer as claimed in claim 35, said stop means being manually releasable from the speed indicating means, and means to indicate such manual release.

37. In a speedometer having means to indicate the speed of a vehicle, a displaceable means adapted to be displaced due to its inertia when the speedometer is subjected to a lateral jar or shock, and means released by the said displaceable means to retain the speed indicating means giving approximately the speed indication at the instant of such jar or shock.

38. In a speedometer having means to indicate the speed of a vehicle, a weight mounted to be displaced due to its inertia on the speedometer being subjected to a lateral jar or shock, and a retention means normally held inoperative by said weight but releasing on the displacement of said weight to retain the speed indicating means in a condition to give approximately the speed indication at the instant of such jar or shock.

39. In a speedometer as claimed in claim 38, said speed indicating means being manually operable by an authorized party to indicate a speed other than that at the time of the jar or shock, and means to show changes of speed indication due to manual operation by an unauthorized party.

40. In a speedometer as claimed in claim 38, a cover to enclose the weight and part of the retention means, and a seal operatively connected to the cover and requiring destruction of the seal for removal of the cover.

41. In a speedometer as claimed in claim 38, a resetting means for the weight, and a seal to prevent use of said resetting means without first destroying the seal.

42. In a speedometer having means to indicate the speed of a vehicle, means to stop the speed indicating means at approximately the speed of the vehicle when the vehicle is subjected to a lateral jar or shock, said speed indicating means being manually releasable from said stop means, and means to indicate such releasing of the speed indicating means.

43. In a speedometer having means to indicate the speed of a vehicle, means to stop the speed indicating means at approximately the speed of the vehicle when the speedometer is subjected to a lateral jar or shock, means to set the stopping means inoperative, and means to indicate a resetting of said stopping means.

44. In a speedometer having means to indicate the speed of a vehicle, a weight displaceable when the speedometer is subjected to a lateral jar or shock, a retention means to stop the action of the speed indicating means on such jar or shock, said weight normally being set in relation to the retention means to normally maintain the retention means inoperative, means to reset the weights after displacement and release the retention means, and a seal to prevent operation of the resetting means without first destroying the seal.

45. In a speedometer as claimed in claim 44, a cover to enclose the weight and the retention means, part of the said resetting means and the seal being outside of the said cover.

46. In a speedometer having means to indicate the speed of a vehicle, a weight displaceable when the speedometer is subjected to a lateral jar or shock, a retention means to stop the action of the speedometer indicating means on such jar or shock, said weight normally being set in relation to the retention means to normally maintain the retention means inoperative, a cover enclosing the weight and retention means, and a seal to prevent removal of the cover without first destroying such seal.

WLADIMIRE J. OBIDINE.